United States Patent [19]

Woo

[11] Patent Number: 5,536,515
[45] Date of Patent: Jul. 16, 1996

[54] METHOD FOR SEASONING KIMCHI

[75] Inventor: Ki C. Woo, Kyungsangnam-Do, Rep. of Korea

[73] Assignee: Goldstar Co., Ltd., Seoul, Rep. of Korea

[21] Appl. No.: 376,825

[22] Filed: Jan. 23, 1995

[30] Foreign Application Priority Data

Jan. 24, 1994 [KR] Rep. of Korea .................... 1212/1994

[51] Int. Cl.$^6$ ..................................................... A23L 3/00
[52] U.S. Cl. ............................ 426/231; 426/49; 426/615
[58] Field of Search ................................... 426/231, 615, 426/270, 49, 650; 99/468, 470

[56] References Cited

U.S. PATENT DOCUMENTS

| 4,985,258 | 1/1991 | Rosen | 426/52 |
| 5,142,969 | 9/1992 | Chun | 99/468 |

FOREIGN PATENT DOCUMENTS 92-3868   3/1992   Rep. of Korea .

Primary Examiner—George Yeung
Attorney, Agent, or Firm—Fliesler, Dubb, Meyer & Lovejoy

[57] ABSTRACT

A method for seasoning a kimchi, capable of achieving optimum seasoning of a variety of kimchi in accordance with various kimchi seasoning control patterns made depending on the kind of kimchi, the favorite taste of user and the temperature of kimchi at the beginning point of seasoning, and thereby obtaining the favorite taste of user. The method includes the steps of predetermining a seasoning temperature depending on the kind of the kimchi to be seasoned and a desired kimchi taste, estimating a temperature of the kimchi at the beginning point of a seasoning of the kimchi and predetermining a seasoning time depending on the estimated kimchi temperature, seasoning the kimchi at the predetermined seasoning temperature for the predetermined seasoning time, and storing the seasoned kimchi at a predetermined storage temperature.

5 Claims, 4 Drawing Sheets

METHOD FOR SEASONING KIMCHI

BACKGROUND OF THE INVENTION

1. Field of the Invention

The present invention relates to a method for seasoning a variety of kimchi, and more particularly to a method for seasoning a kimchi, capable of achieving optimum seasoning of a variety of kimchi in accordance with various kimchi seasoning control patterns made depending on the kind of kimchi, the favorite taste of user and the temperature of kimchi at the beginning point of seasoning, and thereby obtaining the favorite taste of user.

2. Description of the Prior Art

Since kimchi which is a spontaneously fermentable, traditional Korean food exhibits an easy acidification at a room temperature, it has an insufficient storage property to keep its peculiar taste for long time. For this reason, there have been proposed various methods which are adapted to season and store kimchi in a refrigerator. In accordance with the known methods, kimchi could be maintained at a good state for long time by appropriately controlling the seasoning time and the seasoning temperature.

However, general refrigerators utilize a single, normalized control pattern for seasoning of kimchi. With such a single, normalized control pattern, it is difficult to well season a variety of kimchi requiring different seasoning temperatures and different seasoning times.

SUMMARY OF THE INVENTION

Therefore, an object of the invention is to provide a method for seasoning a kimchi, capable of achieving optimum seasoning of a variety of kimchi in accordance with various kimchi seasoning control patterns made depending on the kind of kimchi, the favorite taste of user and the temperature of kimchi at the beginning point of seasoning, and thereby obtaining the favorite taste of user.

In accordance with the present invention, this object can be accomplished by providing a method for seasoning a kimchi, comprising the steps of: predetermining a seasoning temperature depending on the kind of the kimchi to be seasoned and a desired kimchi taste; estimating a temperature of the kimchi at the beginning point of a seasoning of the kimchi and predetermining a seasoning time depending on the estimated kimchi temperature; seasoning the kimchi at the predetermined seasoning temperature for the predetermined seasoning time; and storing the seasoned kimchi at a predetermined storage temperature.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 1:
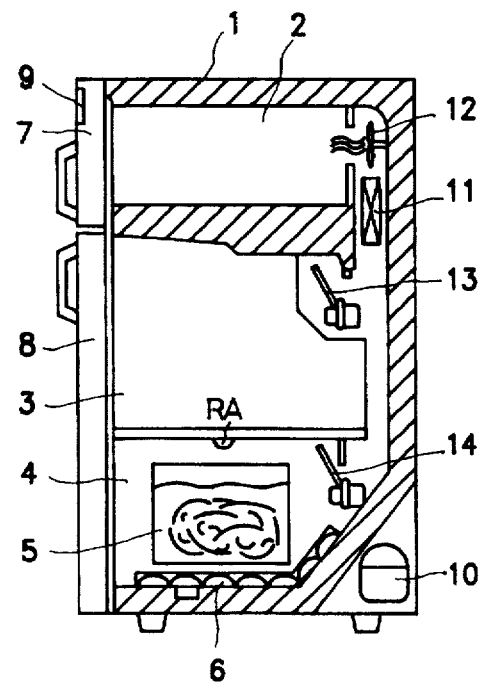
FIG. 1 is a sectional view illustrating a refrigerator to which a kimchi seasoning method in accordance with the present invention is applied.

Referring to FIG. 1, there is illustrated a refrigerator to which a kimchi seasoning method in accordance with the present invention is applied. As shown in FIG. 1, the refrigerator includes a refrigerator body 1 having an upper freezing chamber 2, an intermediate refrigerating chamber 3 and a lower kimchi seasoning chamber 4. The lower kimchi seasoning chamber 4 is adapted to receive a kimchi box 5 for seasoning and storing kimchi. Beneath the kimchi seasoning chamber 4, a kimchi seasoning heater 6 is disposed. A freezing chamber door 7 is attached to the refrigerator body 1 to open and close the freezing chamber 2. To the refrigerator body 1, a refrigerating chamber door 8 is also attached to open and close the refrigerating chamber 3 and the kimchi seasoning chamber 4. A display unit 9 is disposed on a predetermined portion of the outer wall of the freezing chamber door 7 so as to display a current operation of the refrigerator. The refrigerator further includes a compressor 10 installed at the rear lower portion of the refrigerator body 1 and adapted to compress a refrigerant gas, an evaporator 11 install at the upper lower portion of the refrigerator body 1 and adapted to evaporate the refrigerant gas compressed in the compressor 10 and thereby generate a cold air, a cooling fan 12 adapted to blow the cold air generated by the evaporator 11 to various parts of the refrigerator, and a pair of dampers 13 and 14 adapted to control the cold air introduced in the refrigerating chamber 3 and the kimchi seasoning chamber 4, respectively. The kimchi seasoning chamber 4 is disposed in one side of a vegetable chamber (not shown) for storing vegetables. Attached to the display unit 9 is a temperature sensor RT adapted to sense an ambient temperature around the refrigerator. Attached to the upper surface of the kimchi seasoning chamber 4 is a temperature sensor RA adapted to sense the temperature of the kimchi seasoning chamber.

Figure 2:
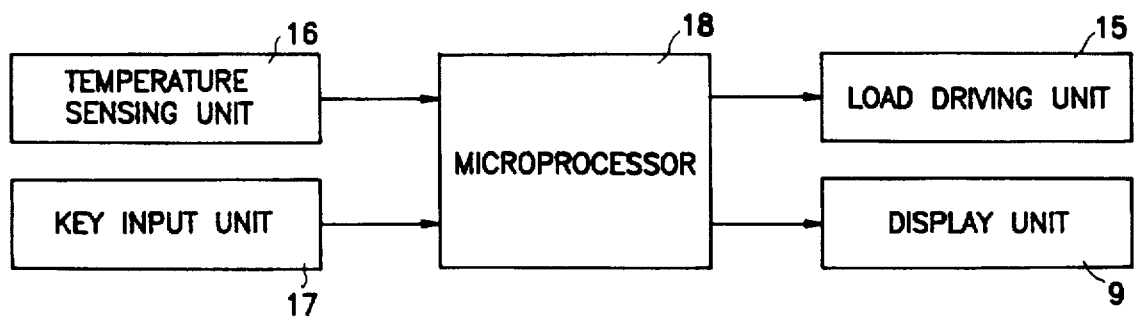
FIG. 2 is a block diagram illustrating a control device equipped in the refrigerator to which the kimchi seasoning method in accordance with the present invention.

FIG. 2 is a block diagram illustrating a control device equipped in the refrigerator to which the kimchi seasoning method in accordance with the present invention.

As shown in FIG. 2, the control device includes a load driving unit 15 for controlling the cooling fan 12, the kimchi seasoning heater 6 and the damper 14 for the kimchi seasoning chamber 4, a temperature sensing unit 16 for sensing the ambient temperature around the refrigerator and the temperature of the kimchi seasoning chamber 4, and a key input unit 17 for generating various key input signals respectively indicative of a menu selection signal, a taste control selection signal and an operation/cancel command signal in accordance with a manipulation of the user. The control device further includes a display unit 9 for displaying the kind of the kimchi selected, the kind of the taste selected and the seasoning step being in process, and a microprocessor 18 for selecting one corresponding to an output signal from the key input unit 17 from various kimchi seasoning control patterns stored therein and controlling the driving of the load driving unit 15 and the driving of the display unit 9 in accordance with the selected kimchi seasoning control pattern.

Figure 3:
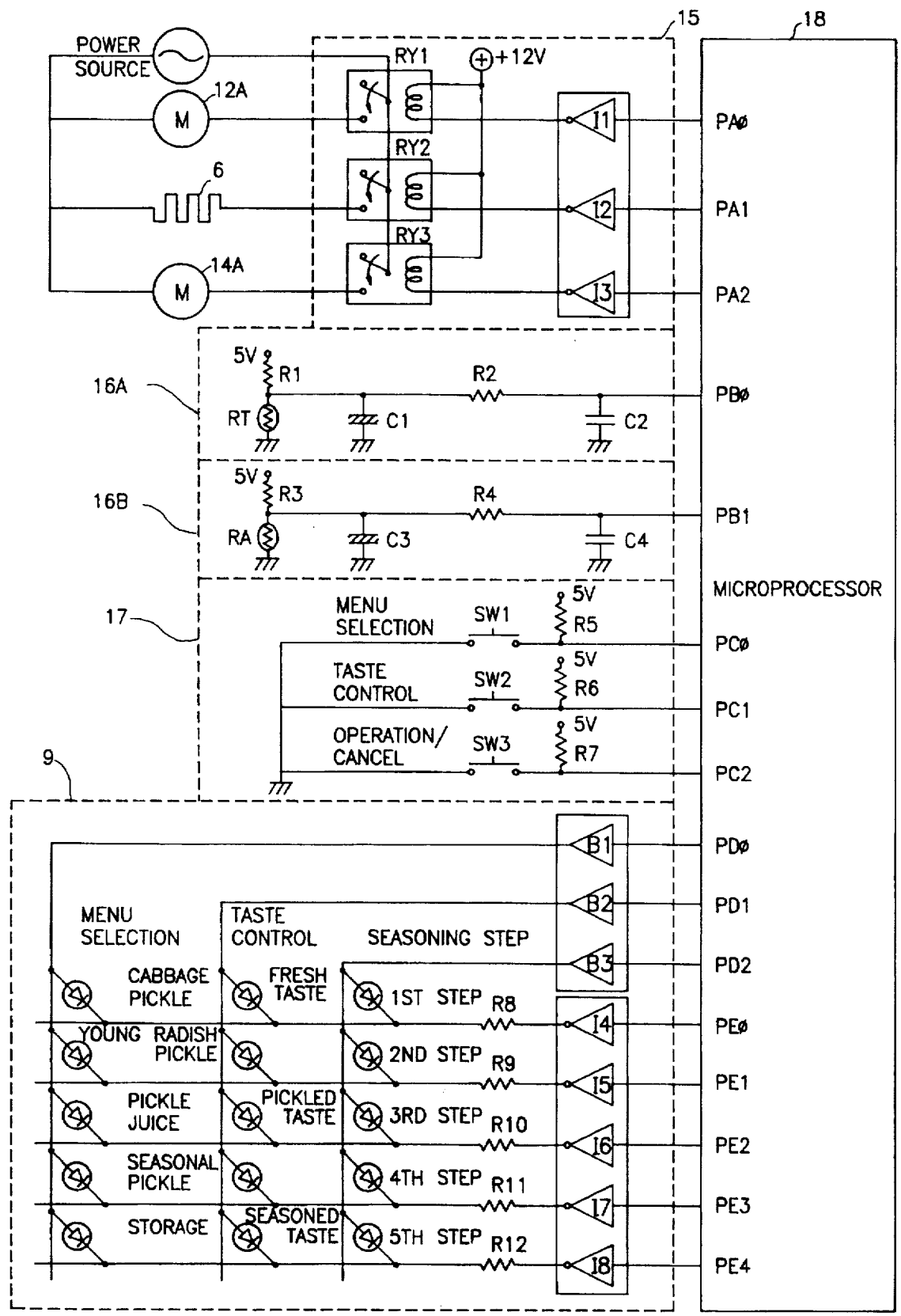
FIG. 3 is a circuit diagram of the control device shown in FIG. 2.

FIG. 3 is a circuit diagram of the control device shown in FIG. 2. As shown in FIG. 3, the load driving unit 15 includes inverters I1 to I3 respectively adapted to invert signals outputted at output ports PA0 to PA2 of the microprocessor 18, and relays RY1 to RY3 respectively adapted to be turned on/off in accordance with signals outputted from the inverters I1 to I3. As the relays RY1 to RY3 of the load driving unit 15 are turned on/off, they control a cooling fan motor 12A, the kimchi seasoning heater 6 and a kimchi seasoning chamber damper motor 14A, respectively.

The temperature sensing unit 16 includes an ambient temperature sensing unit 16A and a kimchi seasoning chamber temperature sensing unit 16B. The ambient temperature sensing unit 16A includes a resistor R1 applied at one terminal thereof with an external voltage of 5 V. The ambient temperature sensor RT also constitutes a part of the ambient temperature sensing unit 16A. The ambient temperature sensor RT is coupled at one terminal thereof to the ground and at the other terminal thereof to the resistor R1 in series. The node between the resistor R1 and the ambient temperature sensor RT is connected to an input port PB0 of the microprocessor 18 via a capacitor C1, a resistor R2 and a capacitor C2. On the other hand, the kimchi seasoning chamber temperature sensing unit 16B includes a resistor R3 applied at one terminal thereof with the external voltage of 5 V. The kimchi seasoning chamber temperature sensor RA also constitutes a part of the kimchi seasoning chamber temperature sensing unit 16B. The kimchi seasoning chamber temperature sensor RA is coupled at one terminal thereof to the ground and at the other tern final thereof to the resistor R3 in series. The node between the resistor R3 and the kimchi seasoning chamber temperature sensor RA is connected to an input port PB1 of the microprocessor 18 via a capacitor C3, a resistor R4 and a capacitor C4.

The key input unit 17 includes a menu selection switch SW1, a taste control switch SW2 and an operation/cancel switch SW3 coupled at one terminals thereof in common to the ground and at the other terminals thereof respectively to input ports PC0 to PC2 of the microprocessor 18. Resistors R5 to R7 applied at one terminals thereof with the external voltage of 5 V are coupled at the other terminals thereof between the switches SW1 to SW3 and the input ports PC0 to PC2 of the microprocessor 18, respectively.

The display unit 9 includes buffers B1 to B3 respectively coupled to output ports PD0 to PD2 of the microprocessor 18 and adapted to buffer signals, indicative of a selected menu, a controlled taste and a seasoning step being in process, outputted at the output ports PD0 to PD2. The display unit 9 also includes inverters I4 to I8 respectively coupled to output ports PE0 to PE4 of the microprocessor 18 and adapted to invert signals outputted at the output ports PE0 to PE4 and then output the inverted signals via resistors R8 to R12. The display unit 9 further includes a matrix of light emitting diodes (LEDs) coupled to output signals from the buffers B1 to B3 and output signals from the inverters I4 to I8 in a matrix manner and adapted to display various operation conditions.

Figure 5:
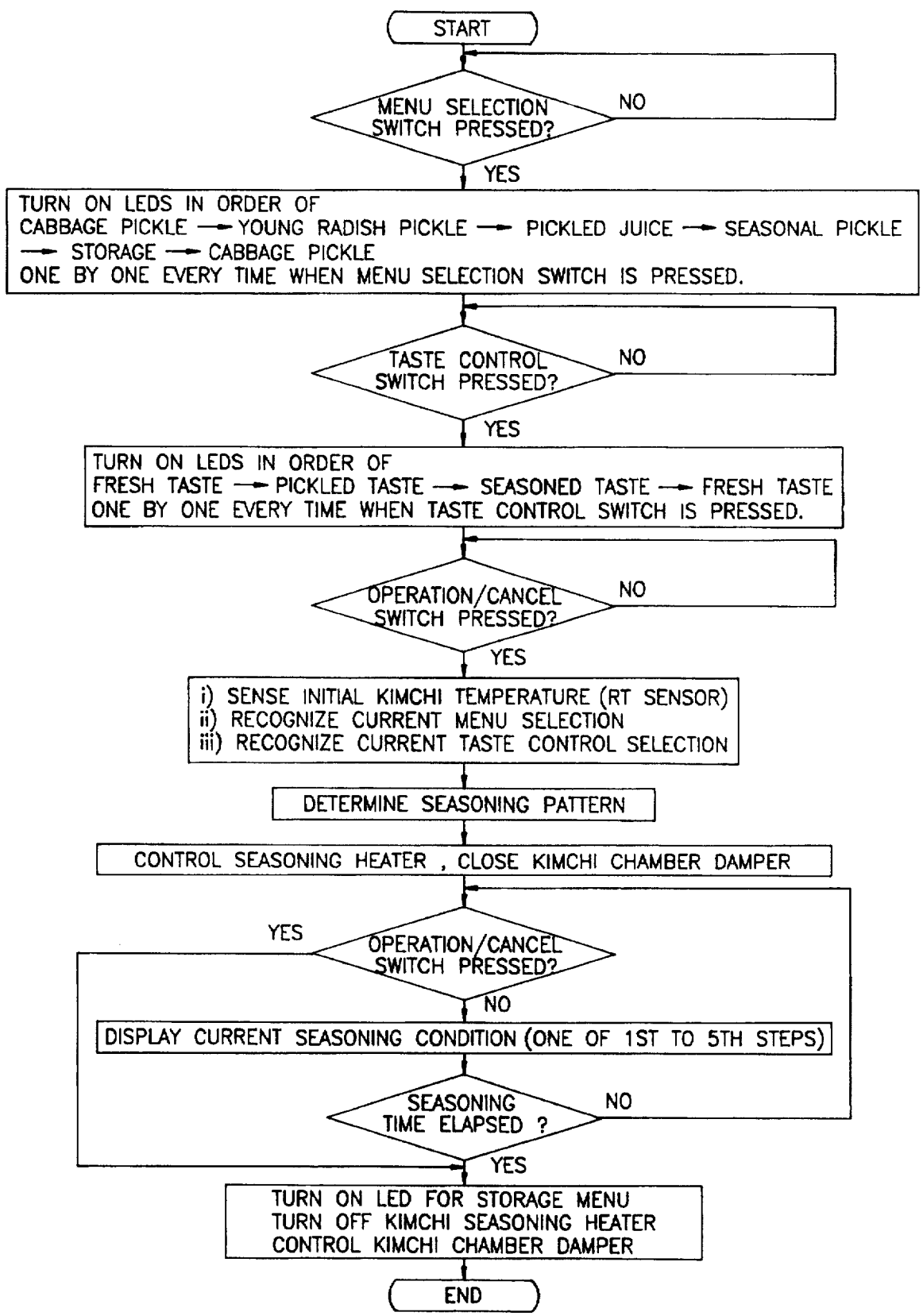
FIG. 5 is a flow chart illustrating the kimchi seasoning method in accordance with the present invention.

Operation of the refrigerator to which the kimchi seasoning method in accordance with the present invention is applied will now be described in conjunction with FIG. 5.

First, a kimchi which may be one of young radish pickles, cabbage pickles, pickle juice and seasonal kimchi is contained in the kimchi seasoning chamber 4. Thereafter, a key input corresponding to the kind of the kimchi is generated manipulating the menu selection switch SW1 of the key input unit 17. The key input from the key input unit 17 is sent to the microprocessor 18. Upon receiving the key input from the key input unit 17, the microprocessor 18 determines whether the received key input corresponds to a menu selection key signal. Where the key input corresponds to the menu selection key signal, the microprocessor 18 selects one from a young radish pickle menu, a cabbage pickle menu, a pickle juice menu, a seasonal kimchi menu and a storage menu depending on the number of menu selection key signals generated. In accordance with the selected menu, a corresponding one of the LEDs of the display unit 9 is turned on to display the selection of the menu desired.

After the menu selection, the microprocessor 18 determines whether the key input received from the key input unit 17 corresponds to a key input for taste control. Where the received key input corresponds to the taste control key input, the microprocessor 18 selects one from a fresh taste, a fresh/pickled taste, a pickled taste, a pickled/seasoned taste, and a seasoned taste. In accordance with the selected taste, a corresponding one of the LEDs of the display unit 9 is turned on to display the selection of the taste desired. After the taste selection, the microprocessor 18 determines whether an operation/cancel key input from the key input unit 17 has been generated.

Figure 4:
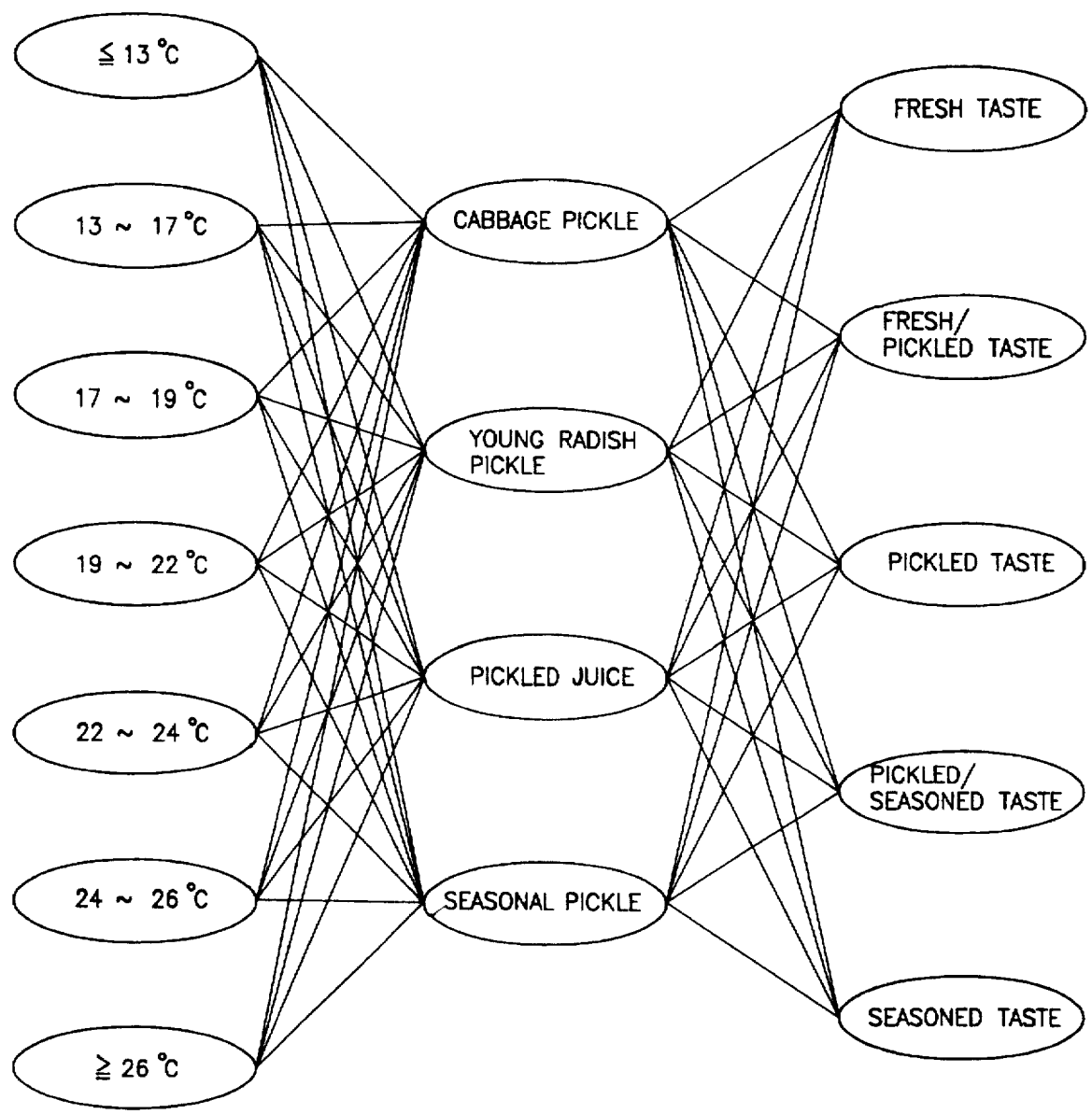
FIG. 4 is a schematic view illustrating control patterns for seasoning of kimchi in accordance with the present invention.

Now, operation of the key input unit 17 will be described. The key input unit 17 is maintained at its inactive state during all the switches SW1 to SW3 are kept opened. When the user presses down one of the switches SW1 to SW3, a current flows in the pressed switch by virtue of a voltage of 5 V applied to a corresponding one of the resistors R5 to R7. By virtue of the current, a signal is applied to a corresponding one of the input ports PC0 to PC2 of the microprocessor 18. As a result, the microprocessor 18 recognizes the key command inputted by the user.

Where the user desires to season a young radish pickle such that it has a fresh taste, he presses down the menu selection switch SW1 two times. The microprocessor 18 recognizes this manipulation and then outputs high-level signals at its output ports PD0 and PE1, respectively. The high-level signal outputted at the output port PD0 is buffered in the buffer B1 and applied to positive terminals of LEDs :for displaying the kind of the kimchi, respectively. On the other hand, the high-level signal outputted at the output port PE1 is inverted into a low-level signal in the inverter I5. The low-level signal is then applied to the negative terminal of the LED for displaying the young radish pickle. Accordingly, the LED for displaying the young radish pickle emits light. At this time, the remaining LEDs are kept inactive because the high-level signal is still applied to their negative terminals, respectively. Where the user presses down the taste control switch SW2 one time, the microprocessor 18 recognizes this manipulation and the outputs high-level signals at its output ports PD0 and PE0, respectively. Accordingly, the LED for displaying the fresh taste is turned on, thereby displaying the desired taste of the user.

Where the user presses down the operation/cancel switch SW3, the key input unit 17 sends a corresponding key input to the microprocessor 18. Where the key input from the key input unit 17 is indicative of the operation, the microprocessor 18 determines the temperature of the kimchi at the beginning point of the seasoning on the basis of an ambient temperature sensed by the ambient temperature sensor RT. The kimchi temperature at the beginning point of the seasoning is generally dependent on the temperature of water used in washing picked cabbages to be dressed with condiments. Where the pickled cabbages are washed with a city water, the kimchi temperature at the beginning point of the seasoning is estimated to be a temperature obtained by deducting 3° C. from the ambient temperature sensed by the ambient temperature sensor RT because the temperature of the water is lower than the temperature of atmosphere by about 3° C. Thereafter, the microprocessor 18 determines a kimchi seasoning control pattern by selecting one from various predetermined kimchi seasoning control patterns on the basis of the estimated kimchi temperature at the beginning point of the seasoning. Where a kimchi is to be seasoned using the circuit shown in FIG. 3 under a condition of including 7 kimchi temperatures at the beginning point of the seasoning thereof, 4 kimchi kinds and 5 taste kinds, there are totally provided 140 kimchi seasoning control patterns, as shown in FIG. 4. In FIG. 4, the left column represents the kimchi temperatures at the beginning point of the seasoning, the intermediate column the kimchi kinds and the left column the taste kinds, namely, the seasoning degrees.

Now, the procedure of determining the kimchi seasoning control pattern will be described. As the user selects a desired kimchi kind using the menu selection key and a desired taste using the taste control key, an appropriate seasoning temperature is determined depending on the selected kimchi kind and the selected taste. Meanwhile, the seasoning time is varied depending on the kimchi temperature at the beginning point of the seasoning. For example, where the kimchi temperature at the beginning point of the seasoning is high as in summer, the time taken to season the kimchi becomes shortened even though the same kimchi kind and the same taste are selected. On the contrary, where the kimchi temperature at the beginning point of the seasoning is low as in winter, the time taken to season the kimchi becomes extended. Accordingly, the time taken to optimally season the kimchi is varied depending on the kimchi temperature at the beginning point of the seasoning. In accordance with the present invention, a plurality of temperature ranges including, for example, the range of not more than 13° C., the range of 13° to 17° C., . . . , and the range of 26° C. are used so as to predetermine a seasoning time depending on the kimchi temperature at the beginning point of the seasoning even in kimchi's of the same kind and the same taste.

Thereafter, the microcomputer 18 controls driving of the kimchi seasoning heater 6 and driving of the damper 14 for the kimchi seasoning chamber 4 in accordance with the kimchi seasoning control pattern predetermined as mentioned above so that an appropriate seasoning is processed. To this end, the microprocessor 18 outputs a high-level signal at its output port PA2. The high-level signal is sent to the inverter I3 which, in turn, inverts the received signal to a low-level signal. As a result, an external voltage of 12 V is applied to the coil of the relay RY3, so that a current flows through the coil, thereby causing the relay RY3 to be switched to its closed state. At the closed state of the relay RY3, the damper motor 14A is energized, thereby causing the damper 14 to be closed. Accordingly, no cold air is supplied to the kimchi seasoning chamber 4. As the microprocessor 18 outputs a high-level signal at its output port PA1 periodically, the relay RY2 for controlling the kimchi seasoning heater 6 is periodically activated in a manner similar to the relay RY3 for controlling the damper motor 14A. As a result, the kimchi seasoning heater 6 is periodically energized, so that the temperature of the kimchi seasoning chamber 4 reaches the predetermined seasoning temperature. At the seasoning temperature, seasoning of the kimchi is carried out.

During the seasoning of the kimchi, the microprocessor 18 controls the LEDs of the display unit 9 to display each seasoning step being in process. That is, the microprocessor 18 performs its display control to display the seasoning steps in the order of the first step→the second step→the third step→the fourth step→the fifth step through the LEDs. After completion of the kimchi seasoning, the LED for storage display is turned on to display the completion of the kimchi seasoning procedure.

After the completion of the kimchi seasoning procedure, the microprocessor 18 operates to turn off the kimchi seasoning heater 6. Thereafter, the kimchi seasoning chamber temperature sensing unit 16A senses the temperature of the kimchi seasoning chamber 4 and sends the sensed temperature to the microprocessor 18. Based on the sensed temperature, the microprocessor 18 controls the relays RY1 and RY3 in order to appropriately drive the cooling fan motor 12A and the kimchi seasoning chamber damper motor 14A. Thus, the kimchi seasoning chamber 4 is maintained at a temperature of about 3° C. to appropriately store the seasoned kimchi. Since the temperature sensing operation of the temperature sensing unit 16 is well known, its detailed description is omitted.

On the other hand, when the user is desired to cancel the kimchi seasoning procedure as mentioned above, he presses down the operation/cancel key one more time. By this manipulation, the kimchi seasoning procedure is canceled. Subsequently, a kimchi storage operation is carried out.

As apparent from the above description, the present invention provides a method for seasoning a kimchi, capable of achieving optimum seasoning of a variety of kimchi in accordance with various kimchi seasoning control patterns made depending on the kind of kimchi, the favorite taste of user and the temperature of kimchi at the beginning point of seasoning, and thereby obtaining the favorite taste of user.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method for seasoning a kimchi, comprising the steps of:

predetermining a seasoning temperature depending on the kind of the kimchi to be seasoned and a desired kimchi taste;

detecting an ambient temperature surrounding a kimchi storage device and an interior temperature within said kimchi storage device;

estimating a temperature of the kimchi at the beginning point of a seasoning for the kimchi in accordance with the detected ambient temperature and the detected interior temperature and predetermining a seasoning time depending on the estimated kimchi temperature;

seasoning the kimchi at the predetermined seasoning temperature for the predetermined seasoning time; and storing the seasoned kimchi at a predetermined storage temperature.

2. A method in accordance with claim 1, wherein the step of predetermining the seasoning time comprises the steps of:

predetermining a plurality of temperature ranges for the kimchi temperature at the beginning point of the seasoning;

predetermining a plurality of seasoning times for each of the predetermining temperature ranges depending on kinds of kimchi's to be seasoned and desired kimchi tastes;

selecting a temperature range corresponding to the estimated kimchi temperature at the beginning point of the seasoning from the predetermined temperature ranges; and determining a seasoning time corresponding to the kind of the kimchi and the desired kimchi taste from the predetermined seasoning times associated with the selected temperature range.

3. A method in accordance with claim 1, wherein the step of storing the kimchi is carried out when the step of seasoning the kimchi is stopped.

4. A method for seasoning kimchi, comprising the steps of:

predetermining a seasoning temperature based upon a kind of kimchi to be seasoned and a desired kimchi taste;

detecting one or more sensed temperatures that determine the temperature of the kimchi at the beginning of seasoning;

forming an estimated temperature of the kimchi at the beginning of seasoning based upon said one or more sensed temperatures;

predetermining a seasoning time based upon the estimated temperature;

seasoning the kimchi at the predetermined seasoning temperature for the predetermined seasoning time; and storing the seasoned kimchi at a predetermined storage temperature.

5. A method for seasoning kimchi, comprising the steps of:

detecting one or more sensed temperatures that affect the temperature of the kimchi at the beginning of seasoning;

forming an estimated temperature of the kimchi at the beginning of seasoning based upon said one or more sensed temperatures;

predetermining a seasoning temperature based upon a kind of kimchi to be seasoned and a desired kimchi taste; said predetermining step including, predetermining a plurality of temperature ranges for the kimchi temperature at the beginning point of the seasoning;

predetermining a plurality of seasoning times for each of the predetermined temperature ranges depending on kinds of kimchi's to be seasoned and desired kimchi tastes;

selecting a temperature range from the predetermined temperature ranges based upon the estimated temperature at the beginning point of the seasoning; and predetermining a seasoning time corresponding to the kind of kimchi and the desired kimchi taste from the predetermined seasoning times associated with the selected temperature range, seasoning the kimchi at the predetermined seasoning temperature for the predetermined seasoning time; and storing the seasoned kimchi at a predetermined storage temperature.

* * * * *